(12) United States Patent
Shumate (10) Patent No.: US 10,054,433 B2
(45) Date of Patent: Aug. 21, 2018

(54) HEADLAMP AIMING TOOL AND METHOD

(71) Applicant: AMERICAN AUTOMOBILE ASSOCIATION, INC., Heathrow, FL (US)

(72) Inventor: Dwayne Shumate, Eustis, FL (US)

(73) Assignee: American Automobile Association, Inc., Heathrow, FL (US)

( * ) Notice: Subject to any disclaimer, the term of this patent is extended or adjusted under 35 U.S.C. 154(b) by 198 days.

(21) Appl. No.: 15/072,793

(22) Filed: Mar. 17, 2016

(65) Prior Publication Data
US 2017/0268862 A1 Sep. 21, 2017

(51) Int. Cl.
*G01B 11/27* (2006.01)
*G01M 11/06* (2006.01)

(52) U.S. Cl.
CPC ............ *G01B 11/27* (2013.01); *G01M 11/06* (2013.01); *B60Q 2900/00* (2013.01)

(58) Field of Classification Search
CPC ... G01B 5/0025; G01M 11/06; G01M 11/061; G01M 11/067
USPC ............................. 33/288, 335; 356/121, 122
See application file for complete search history.

(56) References Cited

U.S. PATENT DOCUMENTS

| | | | | |
|---|---|---|---|---|
| 2,149,302 A * | 3/1939 | MacMillan | .......... | G01M 11/061 33/288 |
| 2,167,803 A * | 8/1939 | Graham et al. | ...... | G01M 11/061 248/124.1 |
| 2,176,214 A * | 10/1939 | Falge et al. | .......... | G01M 11/061 280/43.17 |
| 3,467,473 A * | 9/1969 | Preston | .................. | G01M 11/06 356/121 |
| 3,666,369 A * | 5/1972 | Carrigan | .............. | G01M 11/067 273/153 R |
| 4,634,275 A * | 1/1987 | Yoshida et al. | ...... | G01M 11/065 348/95 |
| 5,379,104 A * | 1/1995 | Takao | .................. | G01M 11/064 356/121 |
| 8,605,269 B2 | 12/2013 | Yotz et al. | | |
| 8,654,322 B2 | 2/2014 | Peterson | | |
| 2012/0086941 A1* | 4/2012 | Hayes | .................. | G01M 11/061 356/399 |

(Continued)

FOREIGN PATENT DOCUMENTS

| | | | | |
|---|---|---|---|---|
| GB | | 515340 A * | 12/1939 | .......... G01M 11/061 |
| WO | WO 2012131486 A1 * | | 10/2012 | ........... G01B 5/0025 |

*Primary Examiner* — R. A. Smith
(74) *Attorney, Agent, or Firm* — Laubscher, Spendlove & Laubscher, P.C.

(57) ABSTRACT

A headlamp aiming tool includes a linear member and four legs. The first and second legs are used to measure the distance between the headlamps of a vehicle and the height of the headlamps relative to the ground or floor. The tool may also be mounted on the vehicle via the first and second legs and a fastener connected with the third leg arranged between first and second legs. A laser device is connected with the fourth leg and aligned with a centerline of the vehicle to direct a laser beam against a screen in front of the vehicle to indicate the vehicle centerline on the screen. The headlamp light and spacing measurements are used to provide headlamp center points on the screen and to determine the horizontal and vertical offset of the low beam light which is used to adjust the aim of the headlamps.

15 Claims, 5 Drawing Sheets

(56) References Cited

U.S. PATENT DOCUMENTS

2013/0286672 A1\* 10/2013 Godecker et al. .. F21S 48/1742
362/466

\* cited by examiner

HEADLAMP AIMING TOOL AND METHOD

BACKGROUND OF THE INVENTION

Vehicle headlamps operate most efficiently when they are aimed properly. Similarly, properly aimed headlamps are not a distraction or nuisance to oncoming motorists. The headlamps are normally set for proper aim or alignment when the vehicle is manufactured. However, through use, accident, or replacement, the headlamps often become misaligned.

With the recent conversion of most headlamps to halogen bulbs, alignment becomes more difficult because the beam or light dispersion differs from that of prior incandescent bulbs which produced a more focused pattern which was easier to align. Most automobile repair shops do not have the appropriate tools or equipment necessary to re-aim a headlamp for optimum performance and efficiency. Moreover, many states no longer require headlamp aiming checks during inspection of motor vehicles. Thus, headlamp aiming has become a random hit or miss proposition with technicians being limited to guesstimating if a headlamp is properly aimed.

BRIEF DESCRIPTION OF THE PRIOR ART

Various techniques for aiming vehicle headlamps are known in the patented prior art as evidenced by the Peterson U.S. Pat. No. 8,654,322 and Yotz et al U.S. Pat. No. 8,605,269. The Peterson patent, for example, discloses a method and apparatus for measuring the aim location of vehicle headlamps which uses a linear photosensitive array movably mounted on a frame for positioning at predetermined locations to measure light beam intensity and determine the beam pattern and aim point of a headlamp.

The Yotz et al patent discloses headlight aiming apparatus and method including a housing and lens assembly which focuses a headlight beam and forms an image on an internal screen. A control unit is mounted on the housing. The housing and control unit emit laser beams to measure an alignment of the housing with the vehicle. The control unit indicates whether the headlight is properly aimed according to an aiming standard based on the image and the configuration of the vehicle and the apparatus.

While the prior devices operate satisfactorily, they are not suitable for aiming halogen type headlights and are cumbersome for the technician to operate. The present invention was developed in order to overcome these drawbacks by providing a new device and technique for aiming vehicle headlamps, and particularly halogen headlamps.

SUMMARY OF THE INVENTION

Accordingly, it is a primary object of the invention to provide a headlamp aiming tool and method. According to the method, a screen is placed in front of a vehicle. The centerline of the vehicle is determined and indicated on the screen. Next, the center position of each vehicle headlamp is measured relative to the vehicle centerline and indicated on the screen. The headlamps are energized and the area of highest intensity for each headlamp is indicated on the screen.

The vehicle headlamp center position is determined by measuring the height of a center portion of each headlamp relative to a support surface for the vehicle, measuring the distance between the center portions of the headlamps, and translating the height and distance measurements to the screen relative to the vehicle centerline on the screen. In addition, the distance between the light source, i.e. the bulb for each of the headlamps and the screen is measured. A beam offset for each headlamp is calculated as a function of the height of the headlamps and the distance between the headlamps and the screen. Vertical offset is calculated to maximize roadway lighting while minimizing glare. This approach is also suitable for modified vehicles such as trucks and sport utility vehicles that have been altered such as by lifting, thereby increasing the installed height of the headlamp assemblies. The horizontal offset is available to implement based on local ordinance or vehicle manufacturer recommendations. The headlamps are adjusted so that the area of highest intensity for each headlamp is aligned in accordance with the beam offset.

The headlamp aiming tool according to the invention includes a linear member, a first leg connected with one end of the member and a second leg connected with the member for linear movement along the length of the member. A locking device is connected with the second leg to lock the second leg in a selected position on the member in spaced relation from the first leg. By positioning the first leg at the center point of one of the vehicle headlamps and moving the second leg to a position at the center point of the other vehicle headlamps and locking the second leg in that position, the distance between the legs will correspond to the distance between the center points of the vehicle headlamps.

The tool includes a third leg movably connected with the linear member between the first and second legs and a locking device for locking the third leg in a selected position. The free end of the third leg includes a fastener which is removably connected with a portion of the vehicle. A fourth leg including a laser pointer is movably connected with the linear member between the first and second legs and includes a further locking device for locking the fourth leg in place. Preferably, the laser pointer is positioned along the centerline of the vehicle to project the center of the vehicle as a point on a screen positioned in front of the vehicle.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
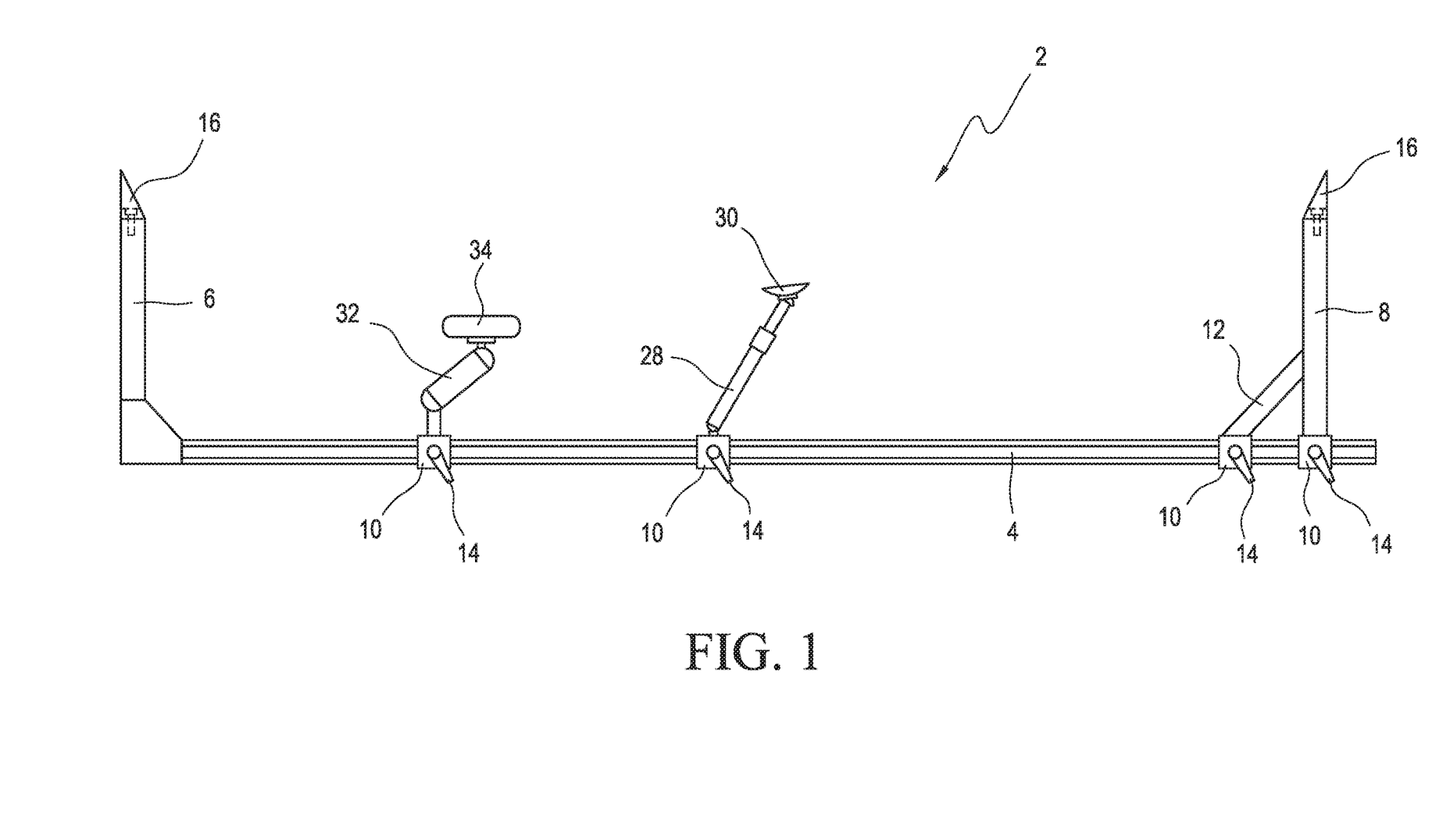
FIG. 1 is a partial plan view of the headlamp aiming tool according to the invention.

Referring first to FIG. 1, the headlamp aiming tool 2 according to the invention will be described. The tool is preferably formed of a strong, lightweight material such as aluminum. It includes a linear member 4 and a plurality of legs connected with the member. The first leg 6 is secured to one end of the linear member 4 and is not movable. It is arranged generally perpendicular to the linear member. A second leg 8 is arranged on the linear member spaced from the first leg. The second leg is also generally perpendicular to the linear member, extending in the same direction as the first leg 6. The second leg is movable along the linear member, such as by sliding, and includes at least one locking device 10 to lock the second leg in a selected position as will be developed below. A brace 12 may be connected with the second leg and is also slidably connected with the linear member via a locking device to maintain the second leg in a perpendicular relation relative to the linear member.

Figure 4:
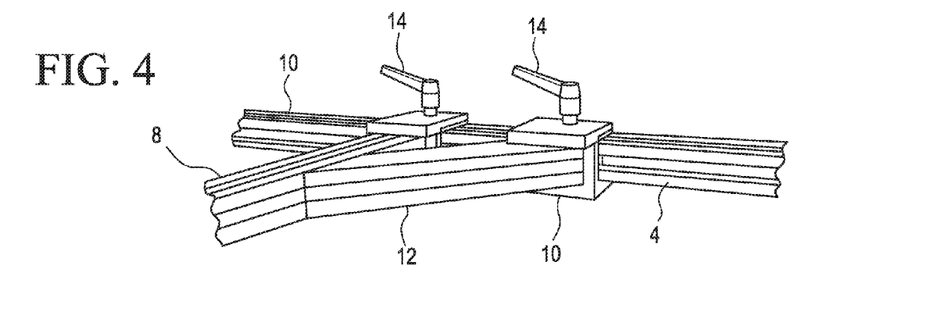
FIG. 4 is a detailed partial plan view of the leg locking mechanism of the headlamp aiming tool of FIG. 1.

Each locking device 10 includes a handle 14 as shown more particularly in FIG. 4 which is operable to clamp and release the device relative to the linear member. Any suitable locking mechanism can be provided in each locking device to claim the locking device against the linear member. For example, a cam may be connected with the handle which when rotated presses the cam against the linear member to lock the device. Alternative locking mechanisms may be provided as known to those of ordinary skill in the art.

The first 6 and second 8 legs of the headlight aiming tool each include a fitting 16 at the free end thereof. The fittings are preferably pivotally connected with the respective legs so that they can rotate relative to the leg. Each fitting is tapered to engage a seam of the vehicle as will be developed below. The fitting is formed of any suitable material for engaging a vehicle. A preferred material is synthetic plastic which will not scratch or damage a vehicle surface.

Figure 2:
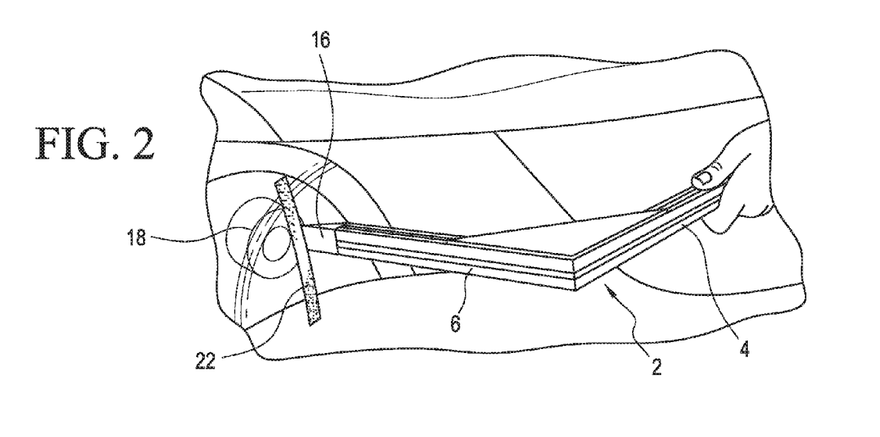
FIGS. 2 and 3 are partial plan views of the tool of FIG. 1 positioned for measuring the distance between the headlamps, respectively, of a vehicle.
Figure 3:
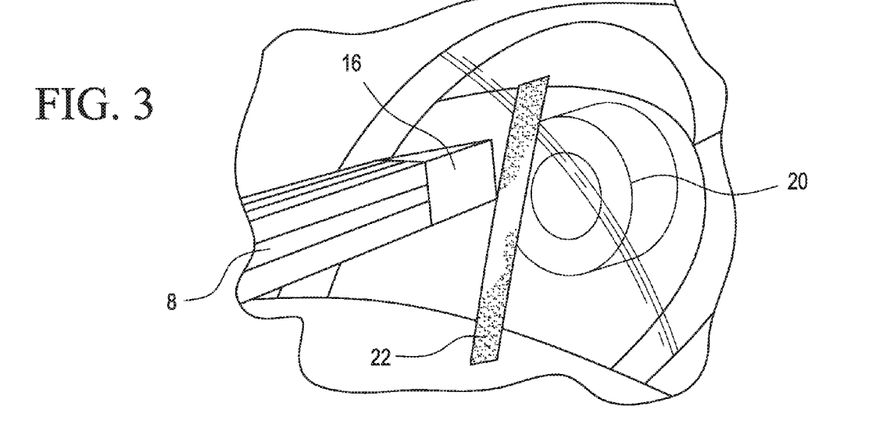
Figures 5, 6, 7:
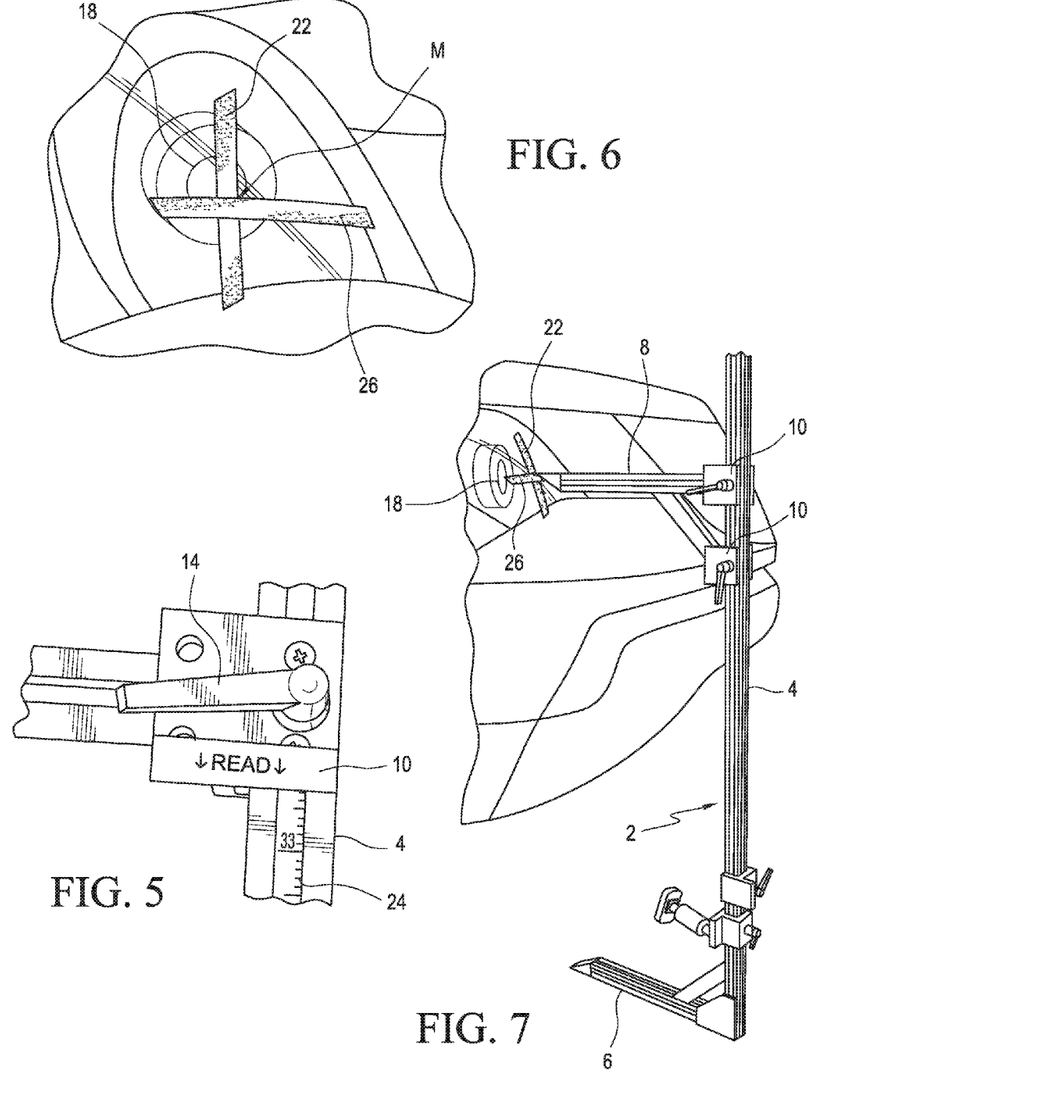
FIG. 5 is a detailed partial view of a scale mounted on the headlamp aiming tool.
FIG. 6 is a detailed view of a headlamp showing the location of an identifier thereof.
FIG. 7 is a partial plan view of the tool of FIG. 1 positioned for measuring the height of a headlamp relative to a support surface.

The headlamp aiming tool can be used to measure the distance between two headlamps 18, 20 on a vehicle as shown in FIGS. 2 and 3. Headlamps sold in the United States are required by law to include a mark such as a small cross or circle etched into the interior surface of the headlamp lens. The mark is the center-beam mark for the low beam of the headlamp. A technician locates this mark on one of the headlamps, such as the headlamp 18 in FIG. 2 and places the end edge of the fitting 16 adjacent the marking. It is helpful to apply a piece of removable tape 22 in a vertical orientation on the headlamp aligned with the headlamp marking to facilitate its location and position the fitting of the fixed leg 6 of the tool 2 at the marking. The technician then unlocks the locking devices 10 connected with the second leg of the tool and slides the leg along the linear member 4 of the tool 2, which extends horizontally across the front of the vehicle, to position the second leg adjacent to the mark (also identified by a vertically oriented piece of removable tape 22) on the other vehicle headlamp 20. The legs are purposely designed to have a length sufficient to accommodate the front end designs of a variety of vehicles so that the linear member can extend across the front of the vehicle without touching the vehicle, except at the points where the fittings engage the headlamps. When the second leg is properly positioned adjacent the headlamp mark, the handles 14 of the locking devices 10 of the second leg 8 are rotated to clamp the second leg on the linear member. The distance between the marks of the vehicle headlamps is read from a scale 24 provided on the linear member as shown in FIG. 5.

The headlight aiming tool 2 according to the invention can also be used to measure the height of each headlamp relative to a support surface such as the floor of a repair shop where the headlights are being aimed. Referring to FIGS. 6 and 7, the tool 2 is positioned with the fixed leg 6 on the floor of a repair shop and the liner member extending vertically in front of a vehicle. A horizontal piece 26 of removable tape is applied to the vehicle headlamps, intersecting the vertical tape 22 at the location of the headlamp low beam center mark M. With the locking members 10 released, the movable second leg 8 is positioned along the linear member 4 of the aiming tool 2 to the location where the fitting 16 of the second leg is adjacent to the mark M. The locking members 10 are operated to clamp the second leg in place. The tool can then be removed from the vehicle and the vertical distance of the headlamp relative to the floor is read from the scale 24 shown in FIG. 5. The headlamp height and spacing measurements are used in the headlamp aiming method as will be described in detail below.

Figures 8, 9, 10:
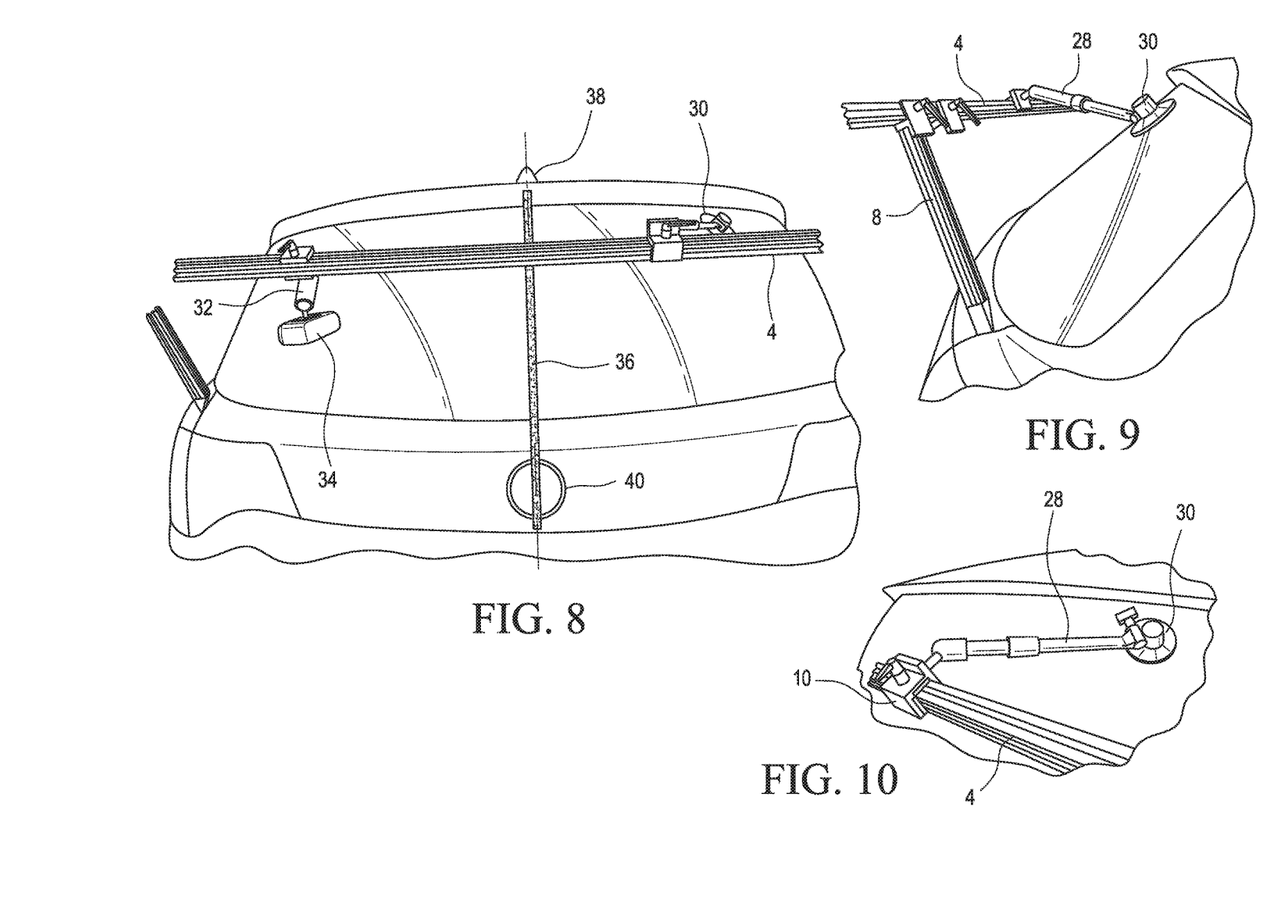
FIGS. 8-10 are rear, side, and top perspective views, respectively, of the headlamp aiming tool for determining the center line of a vehicle.

The headlamp aiming tool can also be used to locate and identify the centerline of the vehicle as shown in FIGS. 8-10. For this procedure, the second leg 8 is positioned and locked onto the linear member so that the fittings 16 of the first and second legs 6, 8 of the tool are arranged adjacent to seams at the rear of the vehicle. In the example shown in FIGS. 8 and 9, the seams are between a hatchback of the vehicle and the vehicle body. Other seams for receiving the tool can be between the vehicle trunk and body or between the vehicle rear window and the vehicle body, depending on the type of vehicle. When so positioned, the fittings of the first and second legs of the tool are wedged into the seams to at least partially connect the tool to the rear of the vehicle.

The tool 2 includes a third leg 28 movably connected with the linear member 4 via a locking member 10. The third leg is arranged between the first and second legs as shown in FIG. 1. The third leg is telescopically adjustable in length and includes a fastener 30 such as a suction cup which is removably connected with a surface of the vehicle such as a rear window. Ball pivots at either end of the third leg enable a wide range of mounting angles. With the third leg locked in place on the linear member and the suction cup connected with the vehicle, the first 6, second 8, and third 28 legs thus provide three mounting points for mounting the headlamp aiming tool on the vehicle.

The tool 2 further includes a fourth leg 32 movably connected with the linear member 4 via a locking member 10. The fourth leg, like the third leg, is positioned between the first and second legs. The fourth leg is pivot mounted and articulated so that its angular orientation relative to the linear member can be adjusted. At the free end of the fourth leg is provided a laser device 34 such as laser pointer or laser distance measuring device. The laser device is connected with the free end of the fourth leg via a rotatable mounting such as a gimbal so that the laser beam can be directed in any direction. In use, the fourth leg is positioned with the laser device aligned along the centerline of the vehicle. In the illustrated example, the centerline can be located by aligning a piece of removable tape 36 on the vehicle with a satellite antenna 38 on the roof of the vehicle and an emblem 40 on the rear of the vehicle. The laser pointer is removable from its mount on the fourth leg for ease measuring the distance from the headlamp light source to the aiming screen.

Figure 11:
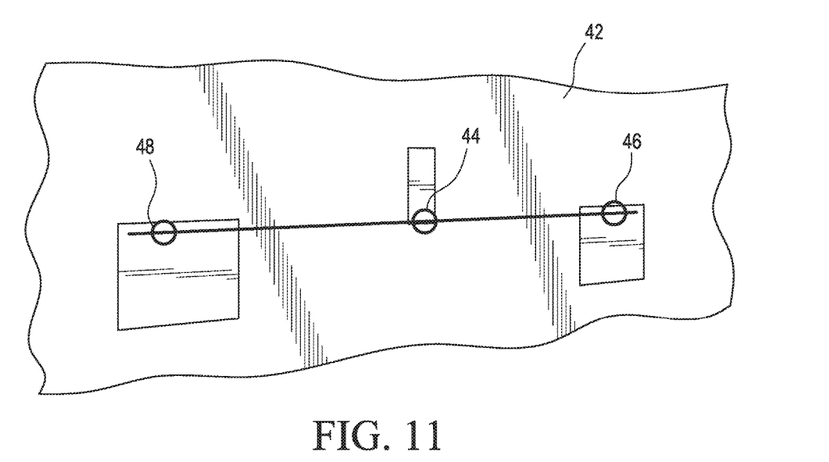
FIG. 11 is a perspective view of a screen showing the centerline and headlamp highest intensity locations.
Figure 12:
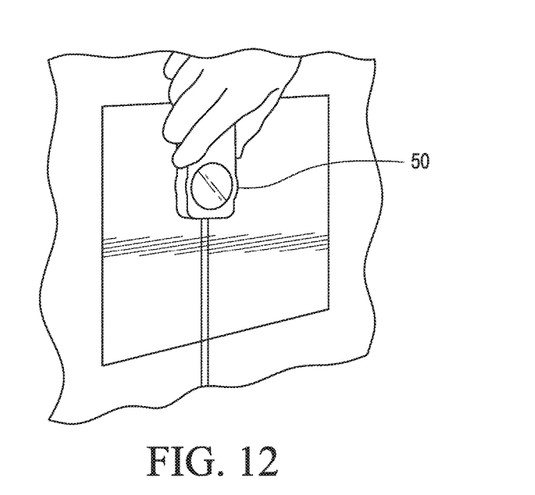
FIG. 12 is a detailed perspective view of a light meter for locating an area of highest headlamp intensity on a screen according to the invention.

A screen 42 or other reference surface such as a wall or garage door is arranged in front of the vehicle as shown in FIG. 11. The laser beam from the laser device is directed onto the screen to transfer the vehicle center to a point 44 on the screen. Based on the measured distance between the headlamps, the centerline for each headlamp can be transferred to the screen, since the distance from the centerline to the center of each headlamp is one-half the distance between the headlamps. Accordingly, the centerline for the right vehicle headlamp 18 can be indicated on the screen at location 46 and the centerline for the left vehicle headlamp 20 is indicated on the screen at location 48. Light from the low beam of the vehicle headlamps is also directed onto the screen. The intensity of the low beam light is measured by a light meter 50 which locates the area of maximum intensity as shown in FIG. 12. If the headlamps are properly aimed, this position of highest intensity for each headlamp beam aligns with the beam offset as will be explained below.

Using the headlight aiming tool 2, the distance between the centers of the vehicle headlamps is measured, as is the height of the headlamps relative to the floor. In addition, the distance from the vehicle light sources or bulbs to the screen is measured, such as by using a laser distance measurement tool. Preferably, the screen is arranged approximately ten feet from the vehicle, but this distance is not particularly critical.

Using a headlamp offset lookup table, the vertical and horizontal beam offset dimensions are determined based on the installed headlamp height and the distance of the headlamp to the screen. The lookup table may be hosted on a cloud server and accessible by the technician via a smartphone.

The vertical and horizontal beam offset from the lookup table are transferred to the alignment screen for the low-beams of both headlamps. This provides a corrected or preferred target for the area of maximum low beam intensity for each headlamp.

The offset is compared with the actual location of maximum beam intensity as measured by the light meter to provide an indication for the amount of adjustment of each vehicle headlamp so that the low beam of the headlamp is properly directed for maximum efficiency for the driver of the vehicle while minimizing distraction to the drivers of oncoming vehicles. For headlamps which include separate light sources for low and high beams, the low beam is preferably used in the aiming procedure. Separate high beam headlamps are aimed using the same techniques and fixture as described above, but with different lookup tables. This is due to the fact that high beam lights do not have a horizontal offset factor and the vertical offset is approximately one-third of the low beam headlamps because the high beams provide useful lighting further down the roadway.

While the preferred forms and embodiments of the invention have been illustrated and described, it will be apparent to those of ordinary skill in the art that various changes and modifications may be made without deviating from the inventive concepts set forth above.

What is claimed is:

1. A tool for assisting in aiming vehicle headlamps, comprising
    (a) a linear member;
    (b) a first leg connected with one end of said linear member;
    (c) a second leg connected with said linear member for movement along a length thereof;
    (d) a locking device connected with said second leg for locking said second leg in a selected position on said linear member in spaced relation from said first leg; and
    (e) a third leg movably connected at one end with said linear member between said first and second legs, said third leg being movable relative to said linear member and including a fastener connected with a free end of said third leg, said fastener being removably connected with a portion of a vehicle, whereby said tool can be used to measure the height of a pair of vehicle headlamps relative to a support surface and the distance between the vehicle headlamps.

2. A tool as defined in claim 1, wherein said first and second legs each include a fitting pivotally connected with a free end of each leg, respectively, for engaging a portion of the vehicle.

3. A tool as defined in claim 1, wherein said third leg is telescopically adjustable in length.

4. A tool as defined in claim 3, wherein said fastener is adjustable about at least two axes for alignment with the vehicle portion for connection therewith.

5. A tool as defined in claim 3, and further comprising a fourth leg removably connected at one end with said linear member between said first and second legs, said fourth leg being movable relative to said linear member and including a laser pointer connected with a free end of said fourth leg, whereby when the tool is mounted on a vehicle, said laser pointer can be positioned along a centerline of the vehicle and generate a point on a screen in front of the vehicle to indicate the vehicle center on the screen.

6. A tool as defined in claim 5, wherein said laser pointer is adjustable about at least two axes.

7. A tool as defined in claim 6, and further comprising locking devices connected with said third and fourth legs to lock said third and fourth legs in selected positions along the length of said linear member.

8. A tool as defined in claim 7, and further comprising a scale connected with said linear body.

9. A method for aiming headlamps of a vehicle relative to an optimum position on a screen in front of the vehicle, comprising the steps of
    (a) aligning a laser pointer with a vehicle centerline and directing a laser beam from the laser pointer to indicate the vehicle centerline on the screen;
    (b) indicating the center position of each vehicle headlamp relative to the vehicle centerline on the screen;
    (c) ascertaining an optimal beam offset for each headlamp and transferring an optimal offset point from each optimal beam offset to the screen relative to each headlamp center position, respectively;
    (d) energizing the vehicle headlamps and determining an area of highest intensity for each headlamp on the screen; and
    (e) adjusting each of the vehicle headlamps to direct the area of highest intensity for each headlamp onto the optimal offset point for each headlamp beam, respectively.

10. A method as defined in claim 9, wherein said laser pointer is adjustably mounted on a fixture connected with the vehicle.

11. A method as defined in claim 9, wherein said vehicle headlamp center position indicating step comprises measuring the height of a center portion of each vehicle headlamp relative to a support surface for the vehicle, measuring the distance between the center portions of the vehicle headlamps, and translating said height and distance measurements to the screen relative to the vehicle centerline on the screen.

12. A method as defined in claim 9, wherein an area of highest intensity for each headlamp is determined using a light meter.

13. A method as defined in claim 12, and further comprising the step of measuring a distance between the vehicle headlamps and the screen.

14. A method as defined in claim 13, and further comprising the step of calculating a beam offset for each headlamp as a function of the height of the headlamps and the distance between the headlamps and the screen.

15. A method as defined in claim 14, wherein said adjusting step comprises aligning the area of highest intensity for each headlamp in accordance with the beam offset, whereby each headlamp will direct a light beam toward an optimum target area.

\* \* \* \* \*